US009501251B1

(12) United States Patent
Khetawat et al.

(10) Patent No.: US 9,501,251 B1
(45) Date of Patent: Nov. 22, 2016

(54) TECHNIQUES FOR PRINT MONITORING

(71) Applicant: Symantec Corporation, Mountain View, CA (US)

(72) Inventors: Rupesh Hanumant Khetawat, Pune (IN); Manish Vinaykumar Pai, Pune (IN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/674,604

(22) Filed: Mar. 31, 2015

(51) Int. Cl.
*G06F 3/12* (2006.01)
*G06K 15/00* (2006.01)

(52) U.S. Cl.
CPC ........... *G06F 3/1238* (2013.01); *G06F 3/1222* (2013.01); *G06F 3/1259* (2013.01); *G06F 3/1267* (2013.01); *G06F 3/1274* (2013.01); *G06F 3/1285* (2013.01); *G06K 15/007* (2013.01); *G06K 15/4095* (2013.01)

(58) Field of Classification Search
USPC ................. 358/1.13, 1.14, 1.16; 711/170
See application file for complete search history.

(56) References Cited

U.S. PATENT DOCUMENTS

| 8,931,042 B1* | 1/2015 | Weiss | G06F 15/16 726/1 |
| 2007/0079100 A1* | 4/2007 | Shiga | G06F 3/061 711/170 |
| 2007/0226256 A1* | 9/2007 | Imai | H04L 63/0823 |
| 2008/0079978 A1* | 4/2008 | Horiuchi | H04N 1/387 358/1.13 |
| 2014/0285834 A1* | 9/2014 | Yamazaki | G06F 3/1274 358/1.14 |
| 2016/0202939 A1* | 7/2016 | Lenin | G06F 3/1238 358/1.14 |

* cited by examiner

*Primary Examiner* — Jerome Grant, II
(74) *Attorney, Agent, or Firm* — Wilmer Cutler Pickering Hale and Dorr LLP

(57) ABSTRACT

Techniques for print monitoring are disclosed. In one embodiment, the techniques may be realized as a method including monitoring a spool directory associated with a printing system; identifying, for a print job file, a file management call that is made before the print job file is submitted to a printer driver to carry out a print job; blocking the file management call; analyzing the print job file for sensitive data; in response to determining that the print job file does not include sensitive data, re-initiating the file management call for the print job file; and submitting the print job file to a printer driver to carry out a print job.

17 Claims, 4 Drawing Sheets

TECHNIQUES FOR PRINT MONITORING

FIELD OF THE DISCLOSURE

The present disclosure relates generally to data loss and, more particularly, to techniques for print monitoring.

BACKGROUND OF THE DISCLOSURE

Modern general-purpose computing systems present a variety of challenges for data loss prevention. It can be difficult to limit the exposure of certain types of data when hundreds of different applications may be available for use on a particular system, each one a potential vector for data loss.

Printing is one avenue by which sensitive data may be extracted from a system. A conventional method to prevent sensitive data printing is to monitor each application to determine if it initiates a printing process. However, this potentially requires a hook into each application and can be thwarted if any single application is missed by the monitoring.

A loss prevention agent can avoid the problem of having to monitor hundreds of applications if, instead, it can monitor a print management system While such central monitoring methods are known for the WINDOWS operating system, no such monitoring system has previously been developed for a Common UNIX Printing System (CUPS) used by MAC OS X and various Linux platforms.

In view of the foregoing, it may be understood that significant problems and shortcomings associated with traditional print monitoring methods may be alleviated in some circumstances by a method for monitoring a CUPS printing system.

SUMMARY OF THE DISCLOSURE

Techniques for print monitoring are disclosed. In one embodiment, the techniques may be realized as a method including monitoring a spool directory associated with a printing system; identifying, for a print job file, a file management call that is made before the print job file is submitted to a printer driver to carry out a print job; blocking the file management call; analyzing the print job file for sensitive data; in response to determining that the print job file does not include sensitive data, re-initiating the file management call for the print job file; and submitting the print job file to a printer driver to carry out a print job.

In accordance with other aspects of this embodiment, the method may further include identifying, for a second print job file, a file management call that is made before the second print job file is submitted to a printer driver to carry out a second print job; blocking the file management call for the second print job file; analyzing the second print job file for sensitive data; and, in response to determining that the second print job file includes sensitive data, deleting the second print job file such that the printer driver does not carry out the second print job.

In accordance with further aspects of this embodiment, the method may further include displaying an alert notifying a user that the second print job has been blocked.

In accordance with further aspects of this embodiment, the method may further include collecting data from the second print job file and at least one additional file in the spool directory regarding the second print job and recording the collected data in an event log.

In accordance with other aspects of this embodiment, the printing system may be a CUPS printing system.

In accordance with another embodiment, the techniques may be realized as an article of manufacture including at least one processor readable storage medium and instructions stored on the at least one medium. The instructions may be configured to be readable from the at least one medium by at least one processor and thereby cause the at least one processor to operate so as to carry out any and all of the steps in the above-described method.

In accordance with another embodiment, the techniques may be realized as a system comprising one or more processors communicatively coupled to a network; wherein the one or more processors are configured to carry out any and all of the steps described with respect to any of the above embodiments.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

A loss prevention agent monitors the content of the directory where print files are created and managed before being sent to the printer driver. The agent interrupts the print call and determines whether a print file includes sensitive data, only allowing files without such data to be passed to the driver. Files in the directory related to the print file can be identified and analyzed to determine metadata associated with the print job.

Figure 1:
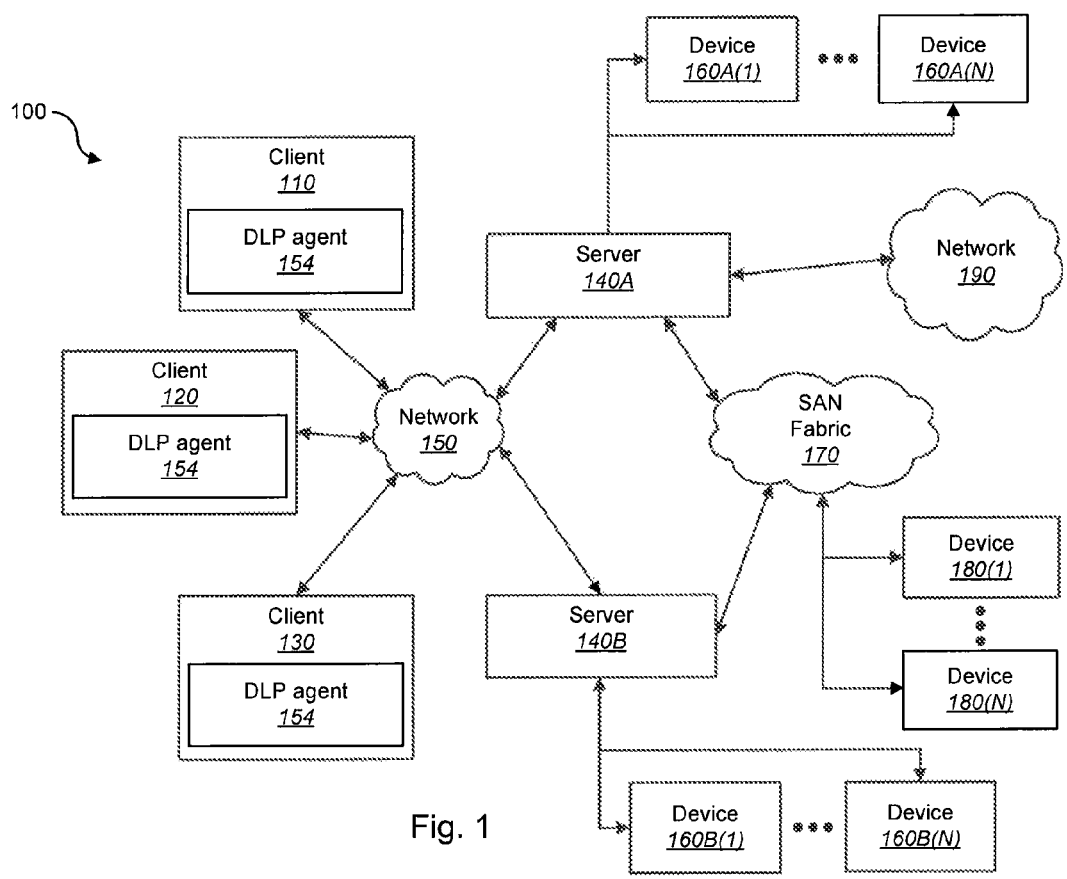
FIG. 1 shows a block diagram depicting a network architecture in accordance with an embodiment of the present disclosure.

FIG. 1 shows a block diagram depicting a network architecture 100 in accordance with an embodiment of the present disclosure. FIG. 1 is a simplified view of network architecture 100, which may include additional elements that are not depicted. Network architecture 100 may contain client systems 110, 120 and 130, as well as servers 140A-140N (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
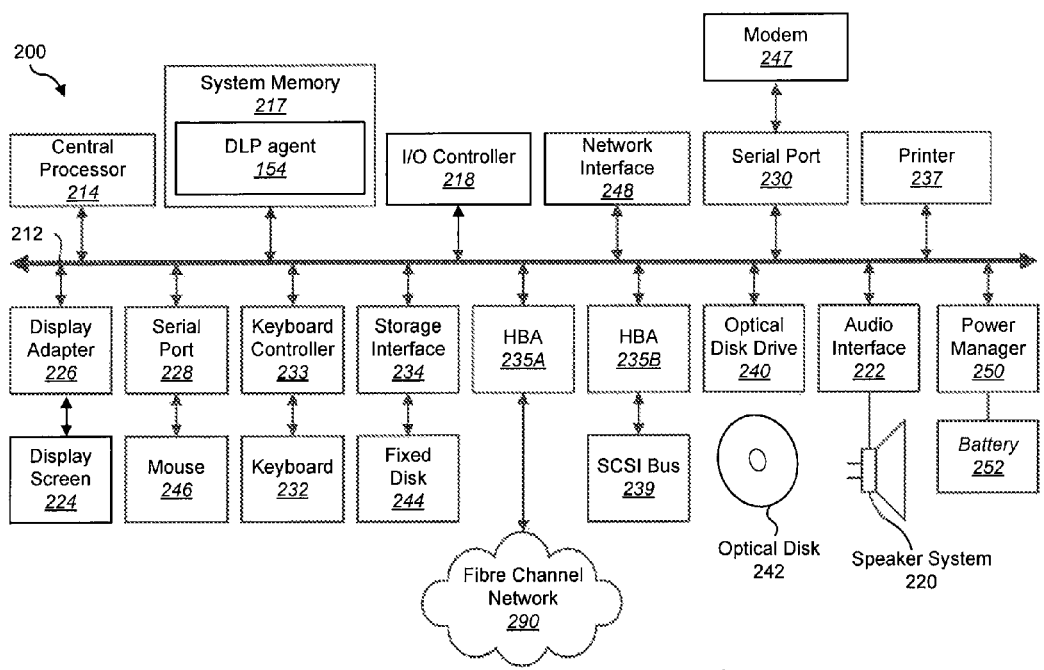
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes. Further, storage devices 160A(1)-(N), 160B(1)-(N), and/or 180(1)-(N) may be implemented as part of a multi-tier storage environment.

According to some embodiments, clients 110, 120, and 130 may be smartphones, PDAs, desktop computers, laptop computers, servers, other computers, or other devices coupled via a wireless or wired connection to network 150. Clients 110, 120, and 130 may receive data from user input, a database, a file, a web service, and/or an application programming interface. In some implementations, clients 110, 120, and 130 may specifically be network-capable mobile devices such as smartphones or tablets.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and 130 may contain one or more portions of software for implementation of data loss prevention such as, for example, data loss prevention (DLP) agent 154. Further, one or more portions of the DLP agent 154 may reside at a network centric location. For example, server 140A may be a server, a firewall, a gateway, or other network element that may perform one or more actions to support management of system and network security elements. According to some embodiments, network 190 may be an external network (e.g., the Internet) and server 140A may be a gateway or firewall between one or more internal components and clients and the external network. According to some embodiments, analysis and approval of resource references including DLP agent 154 may be implemented as part of a cloud computing environment.

FIG. 2 shows a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a printer 237 operative to receive data and/or images for printing, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a printer 237, a removable disk unit (e.g., Universal Serial Bus drive), or other storage medium. According to some embodiments, DLP agent 154 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244 or optical disk 242. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
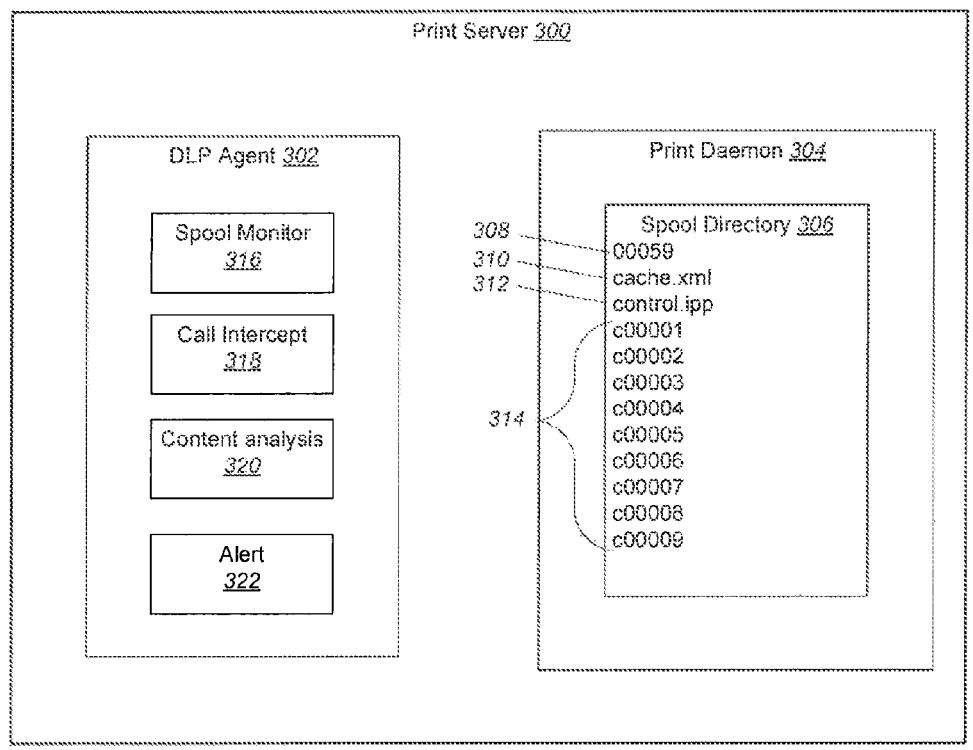
FIG. 3 shows a block diagram illustrating a print server including a DLP agent for print monitoring in accordance with an embodiment of the present disclosure.

FIG. 3 shows an example of a print server 300, which may be any client device or server as described above. Notably, the print server 300 includes a DLP agent 302 for data loss prevention and a print daemon 304 for managing print jobs associated with a printer. The print daemon 304 is configured to manage the printer in accordance with a Common UNIX Printing System (CUPS) protocol, which includes the use of a spool directory 306 in which print files are stored.

In one implementation, the print server 300 receives a print instruction and passes it to the print daemon 304, which translates the request into an intermediate file that is temporarily stored in the spool directory 306. As shown in FIG. 3, the intermediate file 308 named "00059" is stored in the spool directory 306 along with a cache file 310, a control file 312, and a set of print job files 314 each of which represent previously completed print jobs in the history of the print server 300. After updating the cache and control files 310, 312 with information about the new job, the intermediate file 308 is renamed according to the naming scheme for the print job files, and the renamed file is then passed to the printer driver for printing.

To avoid the printing of sensitive data, the DLP agent includes the capability of identifying and intercepting sensitive data before it can be printed. A spool monitor module 316 monitors the creation and modification of files in the spool directory 306. It detects when an intermediate file 308 is created in the directory 306. The print daemon 304 then generates a call to the underlying file management system to rename the intermediate file as a print job file, and this call is intercepted by a call intercept module 318 of the DLP agent 302. Rather than being renamed and sent to the print driver, the file is instead submitted to a content analysis module 320.

The content analysis module 320 may use any set of methods known in the art to detect sensitive data in the print job file. In some implementations, the file may be a PDF or Post-Script file. Text recognition algorithms may be used if necessary. In some implementations, the format of the data may be used to identify it as sensitive data (such as personnel or medical records). In some information, particular content (such as a list of key words associated with non-public projects) may be used to identify sensitive data. Any method for analyzing a file to determine the presence or absence of sensitive data may be used by the content analysis module 320 as appropriate to the print file.

If the content analysis module 320 determines that the file does not include sensitive data, then the intercepted call is allowed to proceed as normal. The print job file is renamed and the print job data is sent to the printer driver for printing. If the content analysis module 320 determines that the file does include sensitive data, then the intercepted call is halted and the file is deleted rather than being renamed. Thus, no print job data is sent to the printer driver and the sensitive information is not printed.

In some implementations, the DLP agent may include an alert module 322 that generates an alert whenever sensitive information is intercepted and printing is prevented. The alert module 322 may, using the job identification number from the name of the print job file, collect both data and metadata regarding the prevented print job. In some implementations, information may be collected from associated cache and/or control files produced as part of the spooling process for the print job. The DLP agent 302 may record any of the collected information in an event log and may provide some or all of this information in an alert which is displayed to the user when the print job is prevented.

Figure 4:
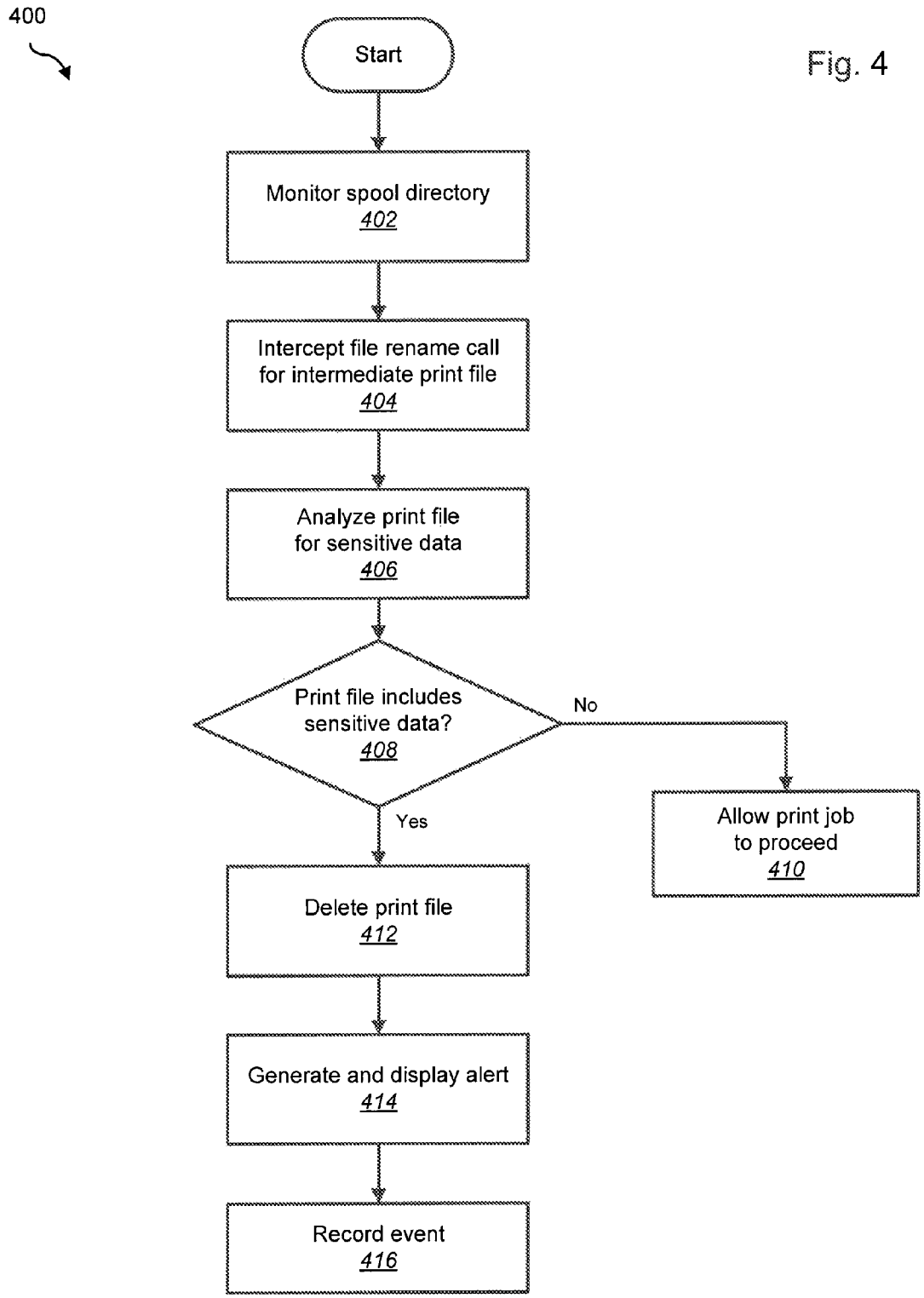
FIG. 4 shows a method for print monitoring in accordance with an embodiment of the present disclosure.

FIG. 4 illustrates a method 400 for print monitoring by a data loss prevention agent. The agent monitors the spool directory in which print job files are first created and then renamed under the CUPS print system (302). In some implementations, the monitoring may occur through the use of any appropriate framework, such as a file system driver. As described above, the agent may monitor the creation of any file in the directory and may specifically identify the creation of intermediate print files which are then renamed before being submitted to the print driver for printing.

Upon identifying a rename call for an intermediate file, the DLP agent intercepts and blocks the rename call, thus interrupting the print process (404). Blocking the call prevents the file from being renamed and submitted to the print driver, and therefore prevents the print job from completing unless the agent later reinitiates the job.

While the print job is blocked from proceeding, the agent analyzes the print file to identify sensitive data (406). Sensitive data may be identified by any method known in the art, which may include identifying the formatting of any text included in the data and may also include matching the data against data known to be sensitive. The agent may also take other factors into account; for example, the identity of the user, the computer system originating the print request, the particular printer designated for carrying out the request, and even time and date information may potentially impact whether the data associated with a particular print job is considered to be too sensitive to print or allowed to be printed.

If the agent determines that the print file does not include sensitive data ("no" from 408), then the print job is allowed to proceed as normal (410). In some embodiments, the agent may have to supply one or more instructions to the system in order to reinitialize the interrupted print process, including the rename call. In some implementations, when the print job is allowed to proceed, there may be no indication to the user that any monitoring or interception occurred by the DLP agent. The system informs the user of the print job being successfully queued and printed.

If the agent determines that the print file includes sensitive data that should not be printed ("yes" from 408), then the print job may not be allowed to proceed. Instead of reinitializing the print job in the system, the agent may delete the intermediate print job file (412). In some implementations, the system may also generate and display an alert to one or more users indicating that the print job was prevented (414).

In addition to the immediate alert, the system may also record the print job prevention event (416). As noted above, this may involve collecting data from the intermediate print job file as well as any cache or control file included in the spool directory or otherwise accessible within the print system. In some implementations, the agent may take further steps if an event log shows multiple blocked printing jobs, such as informing a system administrator of the multiple attempts to print system information, or limiting system access for users with a history of blocked print jobs.

At this point it should be noted that techniques for print monitoring in accordance with the present disclosure as described above may involve the processing of input data and the generation of output data to some extent. This input data processing and output data generation may be implemented in hardware or software. For example, specific electronic components may be employed in DLP agents or similar or related circuitry for implementing the functions associated with print monitoring in accordance with the present disclosure as described above. Alternatively, one or more processors operating in accordance with instructions may implement the functions associated with print monitoring in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A computer-implemented method comprising:
monitoring a spool directory associated with a printing system;
identifying, for a print job file, a file management call that is made before the print job file is submitted to a printer driver to carry out a print job;
blocking the file management call;
analyzing the print job file for sensitive data;
in response to determining that the print job file does not include sensitive data, unblocking the file management call for the print job file; and
submitting the print job file to a printer driver to carry out a print job.

2. The method of claim 1, wherein the print job file is a first print job file and the print job is a first print job, the method further comprising:
identifying, for a second print job file, a file management call that is made before the second print job file is submitted to a printer driver to carry out a second print job;
blocking the file management call for the second print job file;
analyzing the second print job file for sensitive data; and
in response to determining that the second print job file includes sensitive data, deleting the second print job file such that the printer driver does not carry out the second print job.

3. The method of claim 2, further comprising:
displaying an alert notifying a user that the second print job has been blocked.

4. The method of claim 2, further comprising:
collecting data from the second print job file and at least one additional file in the spool directory regarding the second print job; and
recording the collected data in an event log.

5. The method of claim 1, wherein the printing system is a CUPS printing system.

6. At least one non-transitory processor readable storage medium storing a computer program of instructions configured to be readable by at least one processor for instructing the at least one processor to execute a computer process for performing the method as recited in claim 1.

7. The method of claim 1, further comprising monitoring through a file system driver.

8. An article of manufacture comprising:
at least one non-transitory processor readable storage medium; and
instructions stored on the at least one medium;
wherein the instructions are configured to be readable from the at least one medium by at least one processor and thereby cause the at least one processor to operate so as to:
monitor a spool directory associated with a printing system;
identify, for a print job file, a file management call that is made before the print job file is submitted to a printer driver to carry out a print job;
block the file management call;
analyze the print job file for sensitive data;
in response to determining that the print job file does not include sensitive data, unblock the file management call for the print job file; and submit the print job file to a printer driver to carry out a print job.

9. The article of claim 8, wherein the print job file is a first print job file and the print job is a first print job, the at least one processor further operable to:
   identify, for a second print job file, a file management call that is made before the second print job file is submitted to a printer driver to carry out a second print job;
   block the file management call for the second print job file;
   analyze the second print job file for sensitive data; and
   in response to determining that the second print job file includes sensitive data, delete the second print job file such that the printer driver does not carry out the second print job.

10. The article of claim 9, the at least one processor further operable to:
    display an alert notifying a user that the second print job has been blocked.

11. The article of claim 9, the at least one processor further operable to:
    collect data from the second print job file and at least one additional file in the spool directory regarding the second print job; and
    record the collected data in an event log.

12. The article of claim 8, wherein the printing system is a CUPS printing system.

13. A system comprising:
    one or more processors communicatively coupled to a network; wherein the one or more processors are configured to:
      monitor a spool directory associated with a printing system;
      identify, for a print job file, a file management call that is made before the print job file is submitted to a printer driver to carry out a print job;
      block the file management call;
      analyze the print job file for sensitive data;
    in response to determining that the print job file does not include sensitive data, unblock the file management call for the print job file; and
      submit the print job file to a printer driver to carry out a print job.

14. The system of claim 13, wherein the print job file is a first print job file and the print job is a first print job, the one or more processors further configured to:
    identify, for a second print job file, a file management call that is made before the second print job file is submitted to a printer driver to carry out a second print job;
    block the file management call for the second print job file;
    analyze the second print job file for sensitive data; and
    in response to determining that the second print job file includes sensitive data, delete the second print job file such that the printer driver does not carry out the second print job.

15. The system of claim 14, the one or more processors further configured to:
    display an alert notifying a user that the second print job has been blocked.

16. The system of claim 14, the one or more processors further configured to:
    collect data from the second print job file and at least one additional file in the spool directory regarding the second print job; and
    record the collected data in an event log.

17. The system of claim 13, wherein the printing system is a CUPS printing system.

* * * * *